United States Patent [19]
Horwath

[11] 3,939,466
[45] Feb. 17, 1976

[54] SPATIALLY DISTRIBUTED TRANSDUCER FOR TOWED LINE ARRAY APPLICATIONS

[75] Inventor: Tibor G. Horwath, San Diego, Calif.

[73] Assignee: The United States of America as represented by the Secretary of the Navy, Washington, D.C.

[22] Filed: Jan. 24, 1975

[21] Appl. No.: 543,749

[52] U.S. Cl. ................... 340/7 R; 340/8 FT; 340/9; 73/90; 29/594
[51] Int. Cl.² ...................... G01V 1/38; G01V 1/16
[58] Field of Search ............ 340/7 R, 8 FT, 9, 13 R, 340/17; 29/594, 595; 174/101.5; 73/70

[56] References Cited
UNITED STATES PATENTS

| | | | |
|---|---|---|---|
| 2,549,777 | 4/1951 | Craig | 340/13 R |
| 3,375,490 | 3/1968 | Stubblefield | 340/17 |
| 3,480,907 | 11/1969 | King | 340/9 |
| 3,659,257 | 4/1972 | Witzell | 340/8 |
| 3,689,875 | 5/1971 | Kostalnicek | 340/17 |

Primary Examiner—Maynard R. Wilbur
Assistant Examiner—N. Moskowitz
Attorney, Agent, or Firm—Richard S. Sciascia; Ervin F. Johnston; John Stan

[57] ABSTRACT

Transducers based on the variable reluctance concept, employing magnetizable, soft, plastic materials. These materials serve as the isolator between the conductors of a coaxial cable. Such materials exist in considerable variety. The magnetization is azimuthal, such as can be generated by electrical currents flowing through the coaxial cable. Any isolated section of the coaxial cable constitutes a transducer, the conductors at one end of which form the terminals, while those at the other end are connected together to provide a closed electrical circuit. Pressure changes, caused, for example, by acoustic signals, on the outer surface of this transducer produce changes in volume, which in turn induce electrical signals due to changes of the magnetic flux. The conductors of the cable transducer can be in the form of wire braids or metal films, neither of which will significantly change the elastic characteristics of the magnetizable plastic material.

Transducers of this type exhibit an electrical source impedance which is essentially equal to the resistance of the conductors. This eliminates the need of impedance changing preamplifiers. The output signals can be, therefore, transmitted directly over long distances by simple wires placed in the interior of the central, hollow, inner conductor.

6 Claims, 3 Drawing Figures

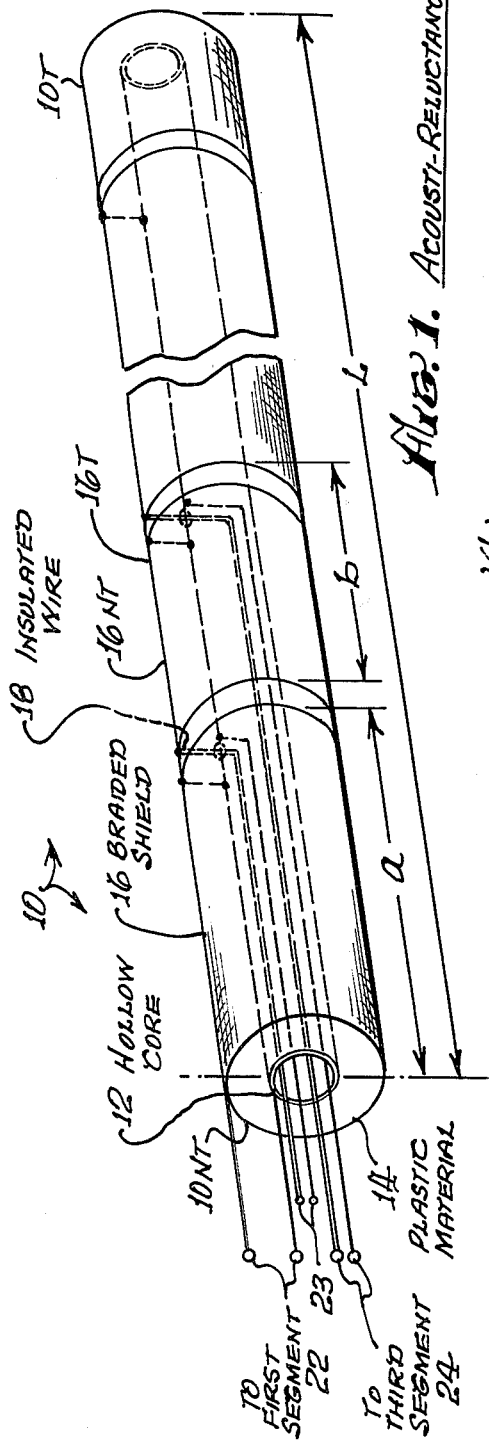
FIG. 1. ACOUSTI-RELUCTANCE COAXIAL CABLE.
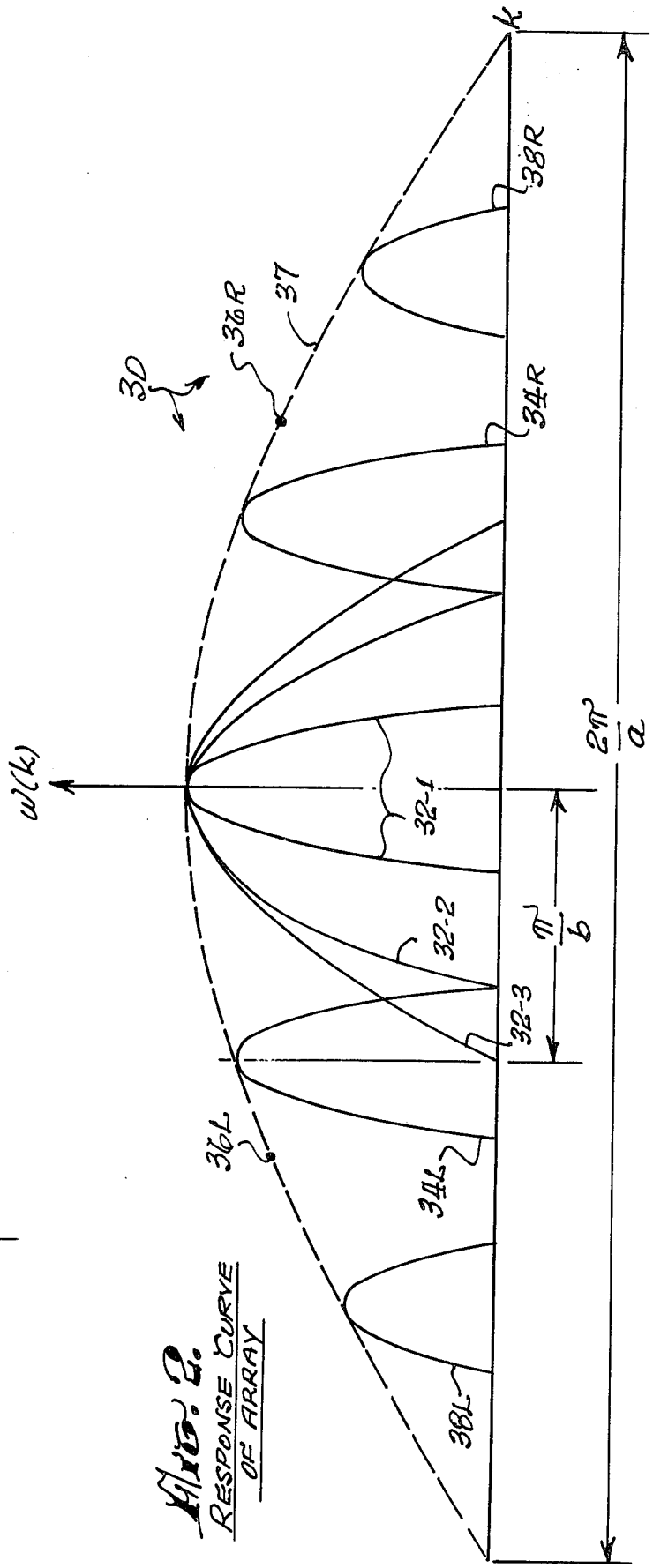
FIG. 2. RESPONSE CURVE OF ARRAY.

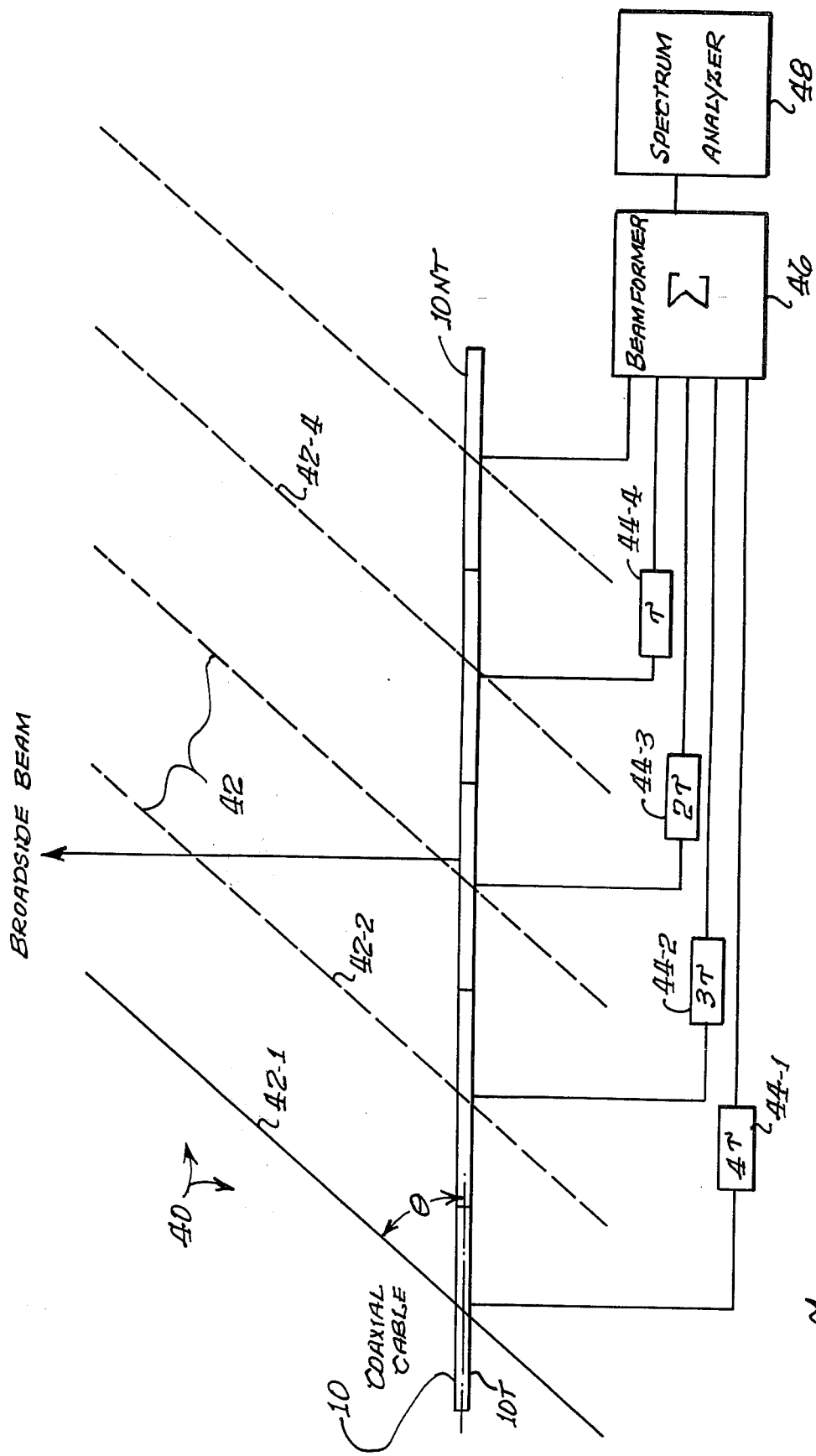

3,939,466

SPATIALLY DISTRIBUTED TRANSDUCER FOR TOWED LINE ARRAY APPLICATIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A prior art towed array, used for a similar purpose, comprises a hose of an elastomeric material, for example rubber, having an outside diameter of about 2 to 4 inches, which may be several miles long, and may be towed by a submarine. It was heavy and unwieldy.

Inside the hose, or cable, are many transducers, perhaps as many as 2,000. There are many wires because the transduced acoustic energy must transmit the corresponding electrical signals to the support vessel. Since one wire for each transducer is impractical, the towed array includes a coaxial cable and telemetering equipment, including amplifiers for amplifying the signals. The prior art array is a high-impedance device, which precludes the use of long wires. In contrast, the towed array of this invention is a low-impedance device.

Prior art towed arrays are plagued by other problems. One problem is boundary-layer noise, another one is internal noise caused by waves propagating inside the array from one transducer to another, caused by flow through the hose that the towed array is made of, or by "cable strumming" caused by towing the cable through the water. Towing the cable may cause the cable to vibrate, and the vibration is coupled into the array, and picked up by the transducers in the array.

Distributed transducers, on the other hand, are inherently insensitive to internal vibrations because of their large size.

SUMMARY OF THE INVENTION

This invention relates to a spatially distributed in-line array of pressure-to-magnetic transducers, suitable for use in a towed line array, the line array having uniform surface impedance over the total length of the array and capable of having a specific buoyancy within wide limits, including neutral buoyancy, comprising a plurality of line transducers, each of which may have a random length as compared to the other line transducers in the linear array, each line transducer comprising a section of a coaxial cable. The cable in turn comprises a central, hollow, flexible, metallic conductor; a magnetizable, plastic, material, for example polyethylene, which is azimuthally magnetized to saturation before operation, surrounding the central conductor; and a flexible, segmented, shielding conductor surrounding the magnetized material, one end of each segment being connected to the central conductor, the other end of each segment, and a corresponding point on the inner conductor, being connectable to measuring equipment by leads traversing the hollow inner conductor. The result is that variations in pressure, for example due to an acoustic signal, along the towed line array are transduced to electrical signals and may be measured, for example by a spectrum analyzer.

The freedom to choose transducer sizes and spacings (with or without outer-shield overlap) allows signal processing schemes to be incorporated into the line array which by far excels those present in current systems having similar objectives. These signal processing schemes relate to spatial-temporal, spatial-frequency, and wavevector-frequency filtering that the line array must perform in order to achieve high signal-to-noise ratios.

Due to the uniformity with which such an array can be constructed, no wavevector conversion will take place. This will abate the increase in noise in those regions of spectral space which the signals may occupy.

The wide variety of magnetizable plastic materials allows for judicious selection of elastic properties in order to reduce the effects of undesirable mechanical vibrations.

A central core within the hollow central conductor can be utilized to provide, if necessary, longitudinal tensile strength.

OBJECTS OF THE INVENTION

An object of the invention is to provide spatially distributed line transducers, useful for towed line arrays.

Another object of the invention is to provide line transducers having uniform surface impedance over the total array consisting of a cascade of such transducers.

Yet another object is to provide line transducers having no restriction on the axial dimension of the transducer elements. Sizes of individual transducers within the array can be selected as desired.

Still another object is to provide line transducers having no restriction in the axial spacing among transducers. Overlap of transducers within the array can be accomodated.

A further object of the invention is to provide line transducers wherein the mechanical properties of the line array consisting of such transducers can be chosen to meet specific requirements. For example, a line array consisting of these transducers can be constructed to possess a specific buoyancy within wide limits, including neutral buoyancy.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a diagrammatic view of the acoustoreluctance coaxial cable of this invention.

FIG. 2 is a set of graphs showing the amplitude response of the array of this invention plotted versus the wave number.

FIG. 3 is a diagrammatic view of the method of using the coaxial cable of this invention in a towed array.

DESCRIPTION OF THE PREFERRED EMBODIMENTS

Referring now to FIG. 1, this figure shows a coaxial cable 10, suitable for use in a towed line array, with one end 10T trailing in the water when in use, comprising a central, flexible, hollow, metallic conductor 12 which serves the function of a common ground for the cable. A magnetizable, plastic, material 14, for example polyethylene, which is azimuthally magnetized to saturation before being put into use, surrounds the central conductor 12. A segmented shield 16 surrounds the plastic material 14, one end 16T, which corresponds to the trailing end 10T of the cable, of each segment being connected to the central conductor 12, which serves as a common ground, the other end 16NT of each segment being connected to an insulated lead 18, which is fed through the hollow central conductor to the non-trailing end 10NT of the cable, where it may be connected to measuring equipment.

The central conductor 12, the magnetized, plastic, material 14, and the segmented shield 16 form a series of spatially distributed pressure-to-magnetic transducers, with the result that variations in pressure, for example due to an acoustic signal, along the cable 10 may be measured, for example by a spectrum analyzer.

In the coaxial cable 10, the segments, for example 22 and 24, of the segmented shield 16 may have a random length with respect to each other, whereas in other embodiments all segments of the shield may have the same length.

In many embodiments, it would be desirable that the cable 10 be neutrally buoyant.

Discussing now in more detail the components of the cable 10, the outer diameter of the inner conductor 12 is in the range of one-half the diameter of the outside shield 16. If the diameter of the inner conductor 12 is too great, then there will not be enough room to place the plastic magnetic material 14, and the developed, transduced, signal will not have enough amplitude. If the inner conductor 12 has too small a diameter, then there will not be enough room for all of the signal transmitting wires 18 to fit within.

The plastic matrix 14 may be a polyethylene impregnated with magnetic particles. The transducer is a variable-inductance type transducer, which when compressed, by an acoustic wave, for example, changes its magnetization.

The magnetic plastic 14 may be forced into a saturated magnetic state by a pulse of energy from a charged capacitor. A pressure acting on any part of the cable generates a voltage.

The plastic material 14 in the cable 10 may also be magnetized by passing a direct current between the central conductor 12 and the outer shield 16. This magnetizes the previously unmagnetized particles in the plastic matrix 14.

As shown in FIG. 1, the outer shield or braid 16 is segmented. An embodiment using an overlapping shield has reduced flow noise. Each segment, for example third segment 24, must be insulated from adjacent segments.

The signal transmitting wires 18 may be of as small a diameter as practicable, inasmuch as the amount of energy transmitted is very small.

As may be seen in FIG. 1, the length of an individual transducer is "$a$", the spacing between two adjacent transducers is "$b$", and the overall length of the array is equal to L. Generally, it may be assumed that all of the transducers are of the same length $a$ and that the spacing $b$ between any two adjacent transducers is the same.

In FIG. 2, the wavenumber response 30 is seen to comprise a main lobe 32 and several minor lobes, for example 34L and 34R, on each side of the main lobe. The zero-power points, 36L and 36R, of the envelope 37 have a spread of $2\pi/a$. As is shown the distance from the center of the main lobe 32 to the center of the first minor lobe 34L is $\pi/b$. The zero-power point of an individual lobe is equal to $2\pi 1L$, that is, $2\pi$ divided by the length of the overall array.

The longer the length L of the array, or cable 10 in FIG. 1, the narrower are the lobes, 34L or 38L. The smaller the length $a$ of the individual transducer elements the more nearly horizontal does the envelope 37 become. The greater the distance $b$ between adjacent transducer elements, the closer together do the lobes 34R and 38R get.

Now, the desired acoustic response is in the main lobe 32. Therefore, it is desired to suppress the side lobes (or grating lobes) 38L, 34L, 34R and 38R. One way of suppressing the side lobes is by making the envelope 37 less of a horizontal line, and one way of doing this is by making $a$, the length of each individual transducer, longer, since the zero-power points of the envelope are located at the points $\pm\pi/a$.

The relative response of the main lobe 32 is improved also by making the spacing $b$ between adjacent transducers as small as possible, resulting in a closely packed array.

The shielded sections 16 of two adjacent transducer segments may even be made to overlap, resulting in an even smaller value for the distance between the two zero-power points, 36L and 36R.

Referring now to FIG. 3, therein is shown an apparatus 40 for determining the presence of a source of acoustic signals, which generates the wave front 42, in an ocean environment through the use of a towed line array, comprising the cable 10 shown in FIG. 1, including the insulated leads, 18 in FIG. 1, one from each of the N segments, the apparatus to be used in a way such that the cable trails in a manner so that the acoustic signals impinge first in time upon the trailing end 10T of the cable.

The apparatus 40 also includes a plurality of N-1 time delay units, 44-1 through 44-4, one for each segment except that segment at the non-trailing end 10NT of the cable 10, the input end of each filter being connected to the insulated lead 18 for its associated segment, the delay time of the filter associated with the segment at the trailing end 10T being (N-1)T, the delay time of the filter associated with the segment adjacent to it being (N-2)T, through a delay time of T for the last filter associated with the segment adjacent to the non-trailing end;

A signal summer 46 has inputs, which are connected to the outputs of the N-1 filters, 44-1 through 44-4, and to the insulated lead 18 which is associated with the segment at the non-trailing end 10NT of the cable 10, the summed output signal varying according to the amplitudes and phases of the acoustic signals generated by the signal source.

A spectrum analyzer 48 has its input connected to the output of the signal summer 46, for analyzing the spectra of the acoustic signals generated by the signal source.

Referring still to FIG. 3, therein is shown transducer array 10 consisting of five segments for simplicity, intersected by a wave front, 42 forming an angle $\theta$ with the axis of the linear array. The wave front represents an acoustic pressure field which sweeps across the transducers, 24, 23, 22 of FIG. 1, for example, of the array 10, one after the other. The outputs of all of the transducers are fed into a beam former 46 where the beam is steered perpendicularly to the wave front 42.

Let us just take one wave front, 42-1. It strikes the left transducer, at the trailing end 10T, first, then the one next to it, etc. The outputs of each of the transducers except that transducer, at the non-trailing end 10NT, which receives the wave front 42 the latest in time are fed to separate delay lines, 44-1 through 44-4, before being fed to the signal summer 46 and then to the spectrum analyzer 48.

The amount of delay in the delay line 44-4 which is connected to the transducer which is next to the right transducer, at the non-trailing end 10NT, is equal to the transit time of the wave front between those two adjacent transducers. The same transit time is involved between any two other adjacent transducers, provided all transducers are of equal length a.

The various signals with their different delays are summed in the summer 46. Therefore, any variation in the wave front 42, and hence in the acoustic pressure field, will be detected by the signal summer. In particular, any maxima in the acoustic pressure field may be detected.

Different delays $T_n$ may be used, since the phase of the wave front 42 along the array 10 changes with incident angle $\theta$. Inserting different time delays permits "listening to different directions" of the acoustic wave.

If it is desired to detect a broadside signal, then no time delays are required.

The detected signal is fed into a spectrum analyzer 48 where the frequency components may be analyzed. The spectrum analyzer 48 would be a broad band analyzer capable of detecting any signal components above a predetermined threshold value.

Obviously many modifications and variations of the present invention are possible in the light of the above teachings. It is therefore to be understood that within the scope of the appended claims the invention may be practiced otherwise than as specifically described.

What is claimed is:

1. A coaxial cable, suitable for use in a towed line array, with one end trailing in the water when in use, comprising:
    a central, flexible, hollow, metallic conductor;
    a magnetizable, plastic, material, which is azimuthally magnetized to saturation before being put into use, surrounding the central conductor;
    a segmented shield, consisting of N segments, surrounding the magnetic material, one end, which corresponds to the trailing end of the cable, of each segment being connected to the central conductor, which serves as a common ground, the other end of each segment being connected to an insulated lead which is fed through the hollow central conductor to the non-trailing end of the cable;
    the central conductor, the magnetized material and the segmented shield forming a linear series of spatially distributed pressure-to-magnetic transducers;
    with the result that variations in pressure, for example due to an acoustic signal, along the cable, may be measured, for example by a spectrum analyzer.

2. The cable according to claim 1, wherein
    the segments of the segmented shield have a random length with respect to each other.

3. The cable according to claim 1, wherein
    all segments of the segmented shield have the same length.

4. The transducer according to claim 2, wherein
    the cable is neutrally buoyant.

5. The cable according to claim 3, wherein
    the cable is neutrally buoyant.

6. Apparatus for determining the presence of a source of acoustic signals in an ocean environment through the use of a towed line array, comprising:
    the cable according to claim 5, including the insulated leads, one from each of the N segments, the apparatus to be used in a way such that the cable trails in a manner so that the acoustic signals impinge first in time upon the trailing end of the cable;
    a plurality of N-1 filters, one for each segment except that segment at the non-trailing end of the cable, the input end of each filter being connected to the insulated lead for its associated segment, the delay time of the filter associated with the segment at the trailing end being (N-1)T, the delay time of the filter associated with the segment adjacent to it being (N-2)T, through a delay time of T for the last filter associated with the segment adjacent to the non-trailing end;
    a signal summer, whose inputs are connected to the outputs of the N-1 filters and to the insulated lead which is associated with the segment at the non-trailing end of the cable, the summed output signal varying according to the amplitudes and phases of the acoustic signals generated by the signal source; and
    a spectrum analyzer, whose input is connected to the output of the signal summer, for analyzing the spectra of the acoustic signals generated by the signal source.

* * * * *